(12) United States Patent
Sundararajan et al.

(10) Patent No.: US 11,553,510 B2
(45) Date of Patent: Jan. 10, 2023

(54) MULTI-SLOT TRANSPORT BLOCK CONFIGURATIONS

(71) Applicant: QUALCOMM Incorporated, San Diego, CA (US)

(72) Inventors: Jay Kumar Sundararajan, San Diego, CA (US); Prashanth Haridas Hande, San Diego, CA (US); Wanshi Chen, San Diego, CA (US); Naga Bhushan, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/176,891

(22) Filed: Feb. 16, 2021

(65) Prior Publication Data

US 2021/0274520 A1    Sep. 2, 2021

Related U.S. Application Data

(60) Provisional application No. 62/982,652, filed on Feb. 27, 2020.

(51) Int. Cl.
*H04W 56/00* (2009.01)
*H04W 72/12* (2009.01)
(Continued)

(52) U.S. Cl.
CPC ....... *H04W 72/1263* (2013.01); *H04L 1/0003* (2013.01); *H04L 1/1819* (2013.01); *H04W 72/0446* (2013.01); *H04W 72/1257* (2013.01)

(58) Field of Classification Search
CPC ......... H04W 72/1263; H04W 72/0446; H04W 72/1257; H04L 1/0003; H04L 1/1819
(Continued)

(56) References Cited

U.S. PATENT DOCUMENTS

2002/0059327 A1* 5/2002 Starkey ................. G06F 16/972
707/999.203
2018/0278368 A1* 9/2018 Kim ....................... H04L 1/1864
(Continued)

FOREIGN PATENT DOCUMENTS

WO    WO-2019183077 A1    9/2019

OTHER PUBLICATIONS

International Search Report and Written Opinion—PCT/US2021/018295—ISA/EPO—dated May 3, 2021.

*Primary Examiner* — Sai Ming Chan
(74) *Attorney, Agent, or Firm* — Arun Swain; Norton Rose Fulbright LLP

(57) ABSTRACT

In some aspects, multi-slot transport block (TB) configurations for communicating data between wireless devices, such as between a base station and a user equipment (UE), in a wireless communication system are described. Some examples of multi-slot configurations enable the communication of large payloads. For example, an application of a wireless device may jointly process data from a large file or other large set of packets. In such examples, the wireless device transmitting the large file may utilize a multi-slot TB including multiple TB segments corresponding to respective slots of a transmission. Similarly, a wireless device receiving the large file may utilize the multi-slot TB configuration for receiving the data.

30 Claims, 12 Drawing Sheets

(51) Int. Cl.
  *H04L 1/00*    (2006.01)
  *H04L 1/18*    (2006.01)
  *H04W 72/04*   (2009.01)
(58) Field of Classification Search
  USPC .......................................................... 370/329
  See application file for complete search history.

(56) References Cited

U.S. PATENT DOCUMENTS

2021/0226732 A1* 7/2021 Yeo ............................ H04L 1/08
2021/0314107 A1* 10/2021 Yoshioka .............. H04L 1/1819
2022/0061049 A1* 2/2022 Chen ................. H04W 72/0453
2022/0085924 A1* 3/2022 Talarico ................ H04L 1/1854
2022/0116171 A1* 4/2022 Zhang .................. H04L 1/0003

* cited by examiner

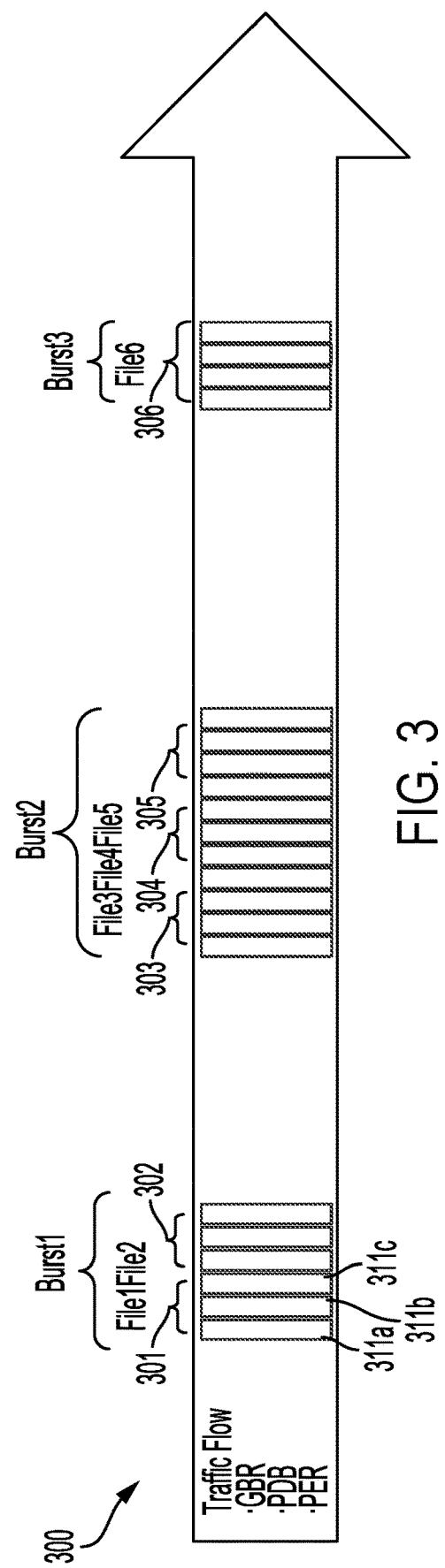

MULTI-SLOT TRANSPORT BLOCK CONFIGURATIONS

CROSS-REFERENCE TO RELATED APPLICATIONS

This application claims the benefit of priority to U.S. Provisional Patent Application No. 62/982,652, entitled, "MULTI-SLOT TRANSPORT BLOCK CONFIGURATIONS," filed on Feb. 27, 2020, the disclosure of which is hereby incorporated by reference herein in its entirety as if fully set forth below and for all applicable purposes.

TECHNICAL FIELD

Aspects of the present disclosure relate generally to wireless communication systems, and more particularly, to multi-slot transport block configurations, such as for communicating large payloads.

INTRODUCTION

Wireless communication networks are widely deployed to provide various communication services such as voice, video, packet data, messaging, broadcast, and the like. These wireless networks may be multiple-access networks capable of supporting communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

Segmentation of the data to be transmitted between base stations and UEs can occur within the protocol stack at the radio link control (RLC) layer and at the physical (PHY) layer. For example, if an RLC service data unit (SDU) is too large to fit within an RLC protocol data unit (PDU) size indicated by a lower layer, such as the PHY layer, then the RLC layer segments the SDU across multiple PDUs. At the PHY layer, if a transport block (TB) is too large to fit within the maximum codeblock (CB) size, the TB is segmented into multiple CBs.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication by a transmitting wireless device is provided. The method may include mapping a plurality of codeblocks (CBs) for a multi-slot transport block (TB) to a plurality of codeblock groups (CBGs). The method may also include mapping a plurality of sets of one or more CBGs of the plurality of CBGs to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The method may further include transmitting, to a receiving wireless device, the multi-slot TB including the plurality of CBs over the plurality of slots. Each set of CBGs may correspond to a respective TB segment of a plurality of TB segments of the multi-slot TB.

In another aspect, a method of wireless communication by a receiving wireless device is provided. The method may include receiving, from a transmitting wireless device, a multi-slot TB including a plurality of CBs mapped to a plurality of CBGs. A plurality of sets of one or more CBGs of the plurality of CBGs may be mapped to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The method may also include receiving, from the transmitting wireless device in association with receiving the multi-slot TB, information identifying the CBs as CBs of the multi-slot TB. The method may further include identifying the CBs as CBs of the multi-slot TB based at least in part on the information received in association with the multi-slot TB.

In an aspect, an apparatus configured for wireless communication is provided. The apparatus may include means for mapping a plurality of CBs for a multi-slot TB to a plurality of CBGs. The apparatus may also include means for mapping a plurality of sets of one or more CBGs of the plurality of CBGs to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The apparatus may further include means for transmitting, to a receiving wireless device, the multi-slot TB including the plurality of CBs over the plurality of slots. Each set of CBGs may correspond to a respective TB segment of a plurality of TB segments of the multi-slot TB.

In another aspect, an apparatus configured for wireless communication is provided. The apparatus may include means for receiving, from a transmitting wireless device, a multi-slot TB including a plurality of CBs mapped to a plurality of CBGs. A plurality of sets of one or more CBGs of the plurality of CBGs may be mapped to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The apparatus may also include means for receiving, from the transmitting wireless device in association with receiving the multi-slot TB, information identifying the CBs as CBs of the multi-slot TB. The apparatus may further include means for identifying the CBs as CBs of the multi-slot TB based at least in part on the information received in association with the multi-slot TB.

In an aspect, a non-transitory computer-readable medium having program code recorded thereon for wireless communication by a transmitting wireless device is provided. The program code may include program code for causing the computer to map a plurality of CBs for a multi-slot TB to a plurality of CBGs. The program code may also include program code for causing the computer to map a plurality of sets of one or more CBGs of the plurality of CBGs to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The program code may further include program code for causing the computer to transmit, to a receiving wireless device, the multi-slot TB including the plurality of CBs over the plurality of slots. Each set of CBGs may correspond to a respective TB segment of a plurality of TB segments of the multi-slot TB.

In another aspect, a non-transitory computer-readable medium having program code recorded thereon for wireless communication by a receiving wireless device is provided. The program code may include program code for causing the computer to receive, from a transmitting wireless device, a multi-slot TB including a plurality of CBs mapped to a plurality of CBGs. A plurality of sets of one or more CBGs of the plurality of CBGs may be mapped to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The program code may also include program code for causing the computer to receive, from the transmitting wireless device in association with receiving the multi-slot TB, information identifying the CBs as CBs of the multi-slot TB. The program code may further include program code for causing the computer to identify the CBs as CBs of the multi-slot TB based at least in part on the information received in association with the multi-slot TB.

In an aspect, an apparatus configured for wireless communication is provided. The apparatus includes a memory and at least one processor coupled to the memory. The at least one processor may be configured to map a plurality of CBs for a multi-slot TB to a plurality of CBGs. The at least one processor may also be configured to map a plurality of sets of one or more CBGs of the plurality of CBGs to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The at least one processor may further be configured to transmit, to a receiving wireless device, the multi-slot TB including the plurality of CBs over the plurality of slots. Each set of CBGs may correspond to a respective TB segment of a plurality of TB segments of the multi-slot TB.

In another aspect, an apparatus configured for wireless communication is provided. The apparatus includes a memory and at least one processor coupled to the memory. The at least one processor may be configured to receive, from a transmitting wireless device, a multi-slot TB including a plurality of CBs mapped to a plurality of CBGs. A plurality of sets of one or more CBGs of the plurality of CBGs may be mapped to a plurality of slots of the multi-slot TB. Each set of CBGs may be mapped to a respective slot of the plurality of slots such that all the CBs in each respective CBG are mapped to the respective slot and such that all the CBs in each respective CBG are entirely contained within the respective slot. The at least one processor may also be configured to receive, from the transmitting wireless device in association with receiving the multi-slot TB, information identifying the CBs as CBs of the multi-slot TB. The at least one processor may further be configured to identify the CBs as CBs of the multi-slot TB based at least in part on the information received in association with the multi-slot TB.

Other aspects, features, and implementations of the present disclosure will become apparent to a person having ordinary skill in the art, upon reviewing the following description of specific, example implementations of the present disclosure in conjunction with the accompanying figures. While features of the present disclosure may be discussed relative to particular implementations and figures below, all implementations of the present disclosure can include one or more of the advantageous features discussed herein. In other words, while one or more implementations may be discussed as having particular advantageous features, one or more of such features may also be used in accordance with the various implementations of the disclosure discussed herein. In similar fashion, while example implementations may be discussed below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 shows an example of a communication session traffic flow in which various files may be transported according to some implementations of the present disclosure.

FIGS. 9A and 9B show a baseline example of retransmission in association with traditional use of control block groups (CBGs).

FIGS. 11A and 11B show another example of retransmission in association with the use of CBGs of a multi-slot TB configuration according to some implementations of the present disclosure.

DETAILED DESCRIPTION

Figure 1:
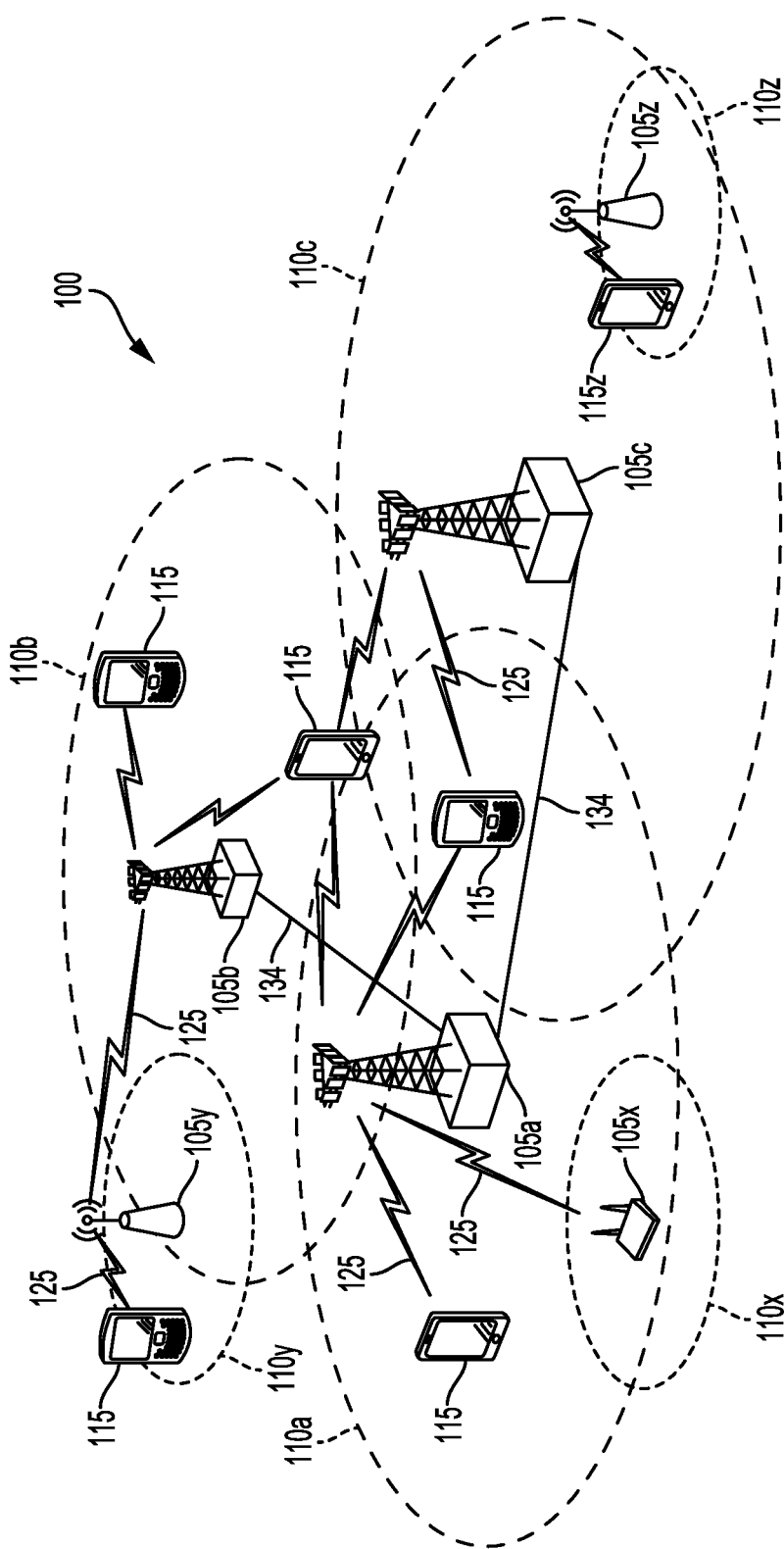
FIG. 1 is a block diagram illustrating details of a wireless communication system according to some implementations of the present disclosure.

Aspects of the present disclosure relate to a multi-slot transport block (TB) configuration for communicating data between wireless devices, such as between a base station and a user equipment (UE), in a wireless communication system (also referred to as a wireless communication network). Some examples of multi-slot configurations described herein enable the communication of large payloads. For example, an application of a wireless device may jointly process data from a large file or other large set of packets (also collectively referred to herein as a large file). In such examples, the wireless device transmitting the large file may utilize a multi-slot TB including multiple TB segments corresponding to respective frame slots of a transmission. Similarly, a wireless device receiving the large file may utilize the multi-slot TB configuration for receiving the data.

Particular implementations of the subject matter described in this disclosure can be implemented to realize one or more of the following potential advantages. In some implementations, the described techniques can be used to communicate large payloads. In accordance with aspects of the present disclosure, by utilizing a multi-slot TB configuration, the size of the TB is not limited to the number of bits that can be transmitted within a single slot. Instead, a multi-slot TB spans multiple slots, such as to fully accommodate an entire radio link control (RLC) service data unit (SDU) without segmentation by the RLC layer. In such examples, the physical (PHY) layer may control segmentation of the TB which may facilitate complete delivery of a file in less time than would be required if using a single-slot TB configuration.

In various implementations, the techniques and apparatus disclosed herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, particular aspects of the apparatus and techniques may be described below with reference to example LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, a person having ordinary skill in the art will understand that additional implementations and use cases may come about in many different arrangements and scenarios. Innovations described herein may be implemented across many differing platform types, devices, systems, shapes, sizes, packaging arrangements. For example, implementations, uses, or a combination thereof may come about via integrated chip implementations, other non-module-component based devices (for example, end-user devices, vehicles, communication devices, computing devices, industrial equipment, retail/purchasing devices, medical devices, AI-enabled devices, etc.), or a combination thereof. While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also include additional components and features for implementation and practice of claimed and described implementations. It is intended that innovations described herein may be practiced in a wide variety of implementations, including both large/small devices, chip-level components, multi-component systems (for example RF-chain, communication interface, processor), distributed arrangements, end-user devices, etc. of varying sizes, shapes, and constitution.

FIG. 1 is a block diagram illustrating details of a wireless communication system according to some implementations of the present disclosure. FIG. 1 shows wireless network 100 for communication according to some implementations. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by a person having ordinary skill in the art, components appearing in FIG. 1 are likely to have related counterparts in other network arrangements including, for example, cellular-style network arrangements and non-cellular-style-network arrangements (for example, device to device or peer to peer or ad hoc network arrangements, etc.).

Turning back to FIG. 1 wireless network 100 includes a number of base stations, such as may include evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and a gNB subsystem serving the coverage area, depending on the context in which the term is used. In implementations of wireless network 100 herein, gNBs 105 may be associated with a same operator or different operators (for example, wireless network 100 may include two or more operator wireless networks), and may provide wireless communications using one or more of the same frequencies (for example, one or more frequency band in licensed spectrum, unlicensed spectrum, or a combination thereof) as a neighboring cell.

A gNB may provide communication coverage for a macro cell or a small cell, such as a pico cell or a femto cell, and other types of cell. A macro cell generally covers a relatively large geographic area (for example, several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (for example, a home) and, in addition to unrestricted access, may also provide restricted access by UEs having an association with the femto cell (for example, UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (for example, two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. Although a mobile apparatus is commonly referred to as user equipment (UE) in standards and specifications promulgated by the $3^{rd}$ Generation Partnership Project (3GPP), such apparatus may also be referred to by a person having ordinary skill in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of Things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (for example, MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (for example, communication links 125) indicates wireless transmissions between a UE and a serving gNB, which is a gNB designated to serve the UE on the downlink and uplink, or desired transmission between gNBs. Although backhaul communication 134 is illustrated as wired backhaul communications that may occur between gNBs, backhaul communications may additionally or alternatively be provided by wireless communications.

Figure 2:
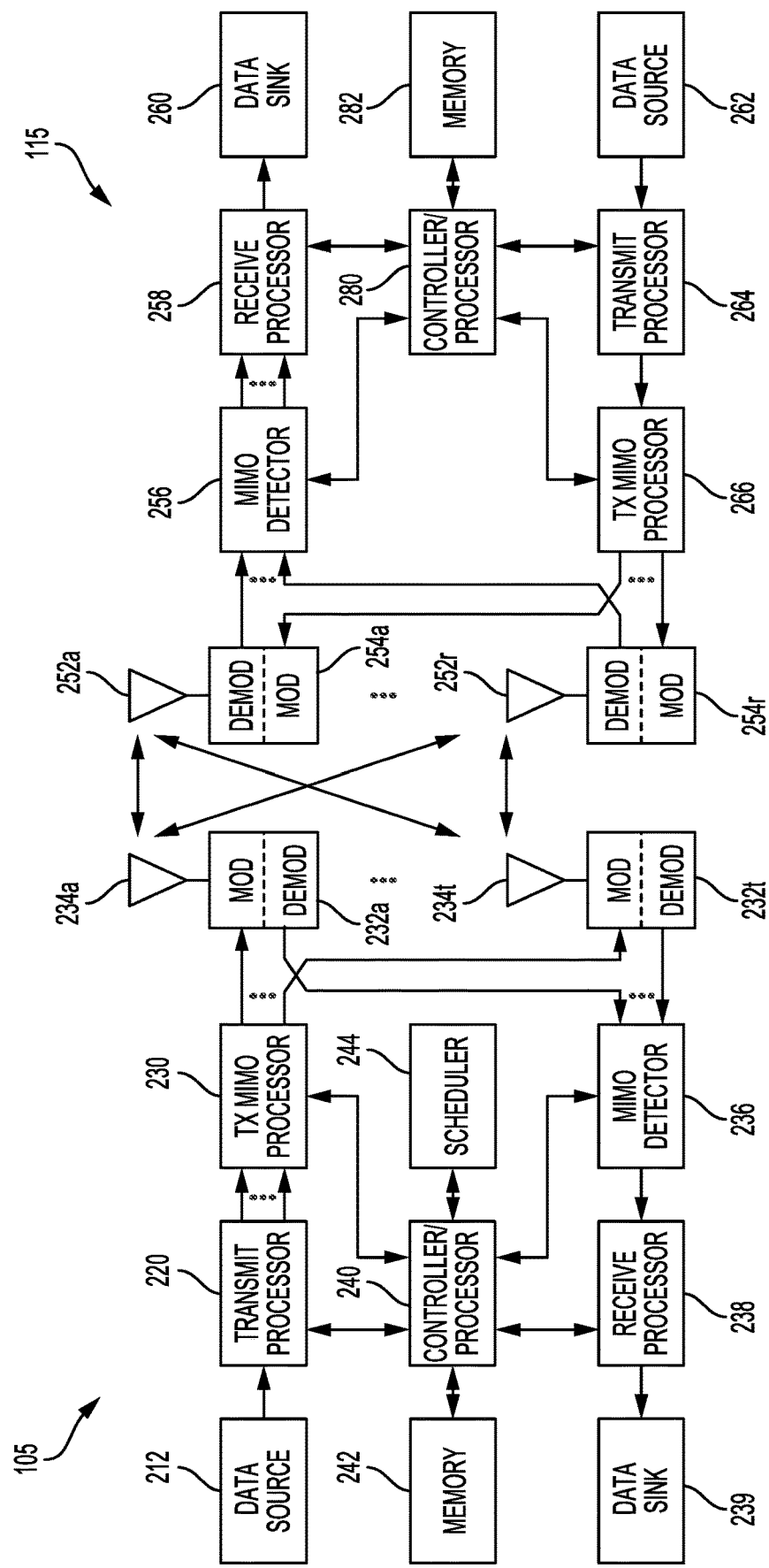
FIG. 2 is a block diagram conceptually illustrating a design of a base station/G node B (gNB) and a user equipment (UE) configured according to some implementations of the present disclosure.

FIG. 2 is a block diagram conceptually illustrating a design of a base station/gNB 105 and a user equipment (UE) 115 configured according to some implementations of the present disclosure. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (for example, encode and symbol map) the data and control information to obtain data symbols and control symbols, respectively. Transmit processor 220 may also generate reference symbols, for example, for the primary synchronization signal (PSS), secondary synchronization signal (SSS), and cell-specific reference signal (CRS). Transmit (TX) multiple-input multiple-output (MIMO) processor 230 may perform spatial processing (for example, precoding) on the data symbols, the control symbols, and reference symbols, if applicable, and may provide output symbol streams to modulators (MODs) 232a through 232t. Each modulator 232 may process a respective output symbol stream (for example, for OFDM, etc.) to obtain an output sample stream. Each modulator 232 may additionally or alternatively process (for example, convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (for example, filter, amplify, downconvert, and digitize) a respective received signal to obtain input samples. Each demodulator 254 may further process the input samples (for example, for OFDM, etc.) to obtain received symbols. MIMO detector 256 may obtain received symbols from all demodulators 254a through 254r, perform MIMO detection on the received symbols if applicable, and provide detected symbols. Receive processor 258 may process (for example, demodulate, deinterleave, and decode) the detected symbols, provide decoded data for UE 115 to data sink 260, and provide decoded control information to controller/processor 280.

On the uplink, at UE 115, transmit processor 264 may receive and process data (for example, for the PUSCH) from data source 262 and control information (for example, for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (for example, for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and other processors and modules at gNB 105 and controllers/processor 280 and other processors and modules at UE 115 may perform or direct the execution of various processes for the techniques described herein, such as to perform or direct the execution illustrated in FIGS. 5 and 6, and other processes for the techniques described herein. Memories 242 and 282 may store data and program codes for gNB 105 and UE 115, respectively. Scheduler 244 may schedule UEs for data transmission on the downlink and uplink.

Wireless devices of wireless network 100, such as any or all of gNBs 105, UEs 115, etc., may participate in communication sessions carrying relatively large payloads. For example, various applications executed by or in association with a UE 115 may exchange large files with another device (for example, a server or another UE, among other examples) via wireless network 100, such as via one or more base stations or gNBs 105. As used herein, a file refers to a set of packets jointly processed by an application, and as such, the term file is not necessarily limited to a single object of a memory or other data record object. For example, a data stream associated with applications such as video streaming or extended reality (XR) may have a natural segmentation into logically connected groups of information bits that may comprise a file in the context of aspects of the multi-slot TBs described herein. As an example, bits corresponding to a single video frame may be considered to be part of the same group. In some examples, the video frame may not be usable if not received as a whole. As such, in some examples of aspects presented herein, a video frame may represent one file. The size of such a file may, for example, vary up to a few hundred kilobytes based on various factors (for example, the video resolution).

FIG. 3 shows an example of a communication session traffic flow 300 in which various files may be transported according to some implementations of the present disclosure. As shown in the example, traffic flow 300 supports the transmission of files (shown as including files 301, 302, 303, 304, 305, and 306) for one or more applications between wireless devices, such as between UEs 115 or from a gNBs 105 to a UE, and vice versa. In some examples, traffic flow 300 may be bursty such that multiple files are generated by the application, or otherwise introduced into the traffic flow, at approximately the same time. In implementing traffic flow 300, the wireless device transmitting the file segments (or "fragments") the file into Internet protocol (IP) packets, such as IP packets 311a, 311b, and 311c of file 301, for example, depending on maximum transmission unit (MTU) settings on the IP stack interfacing with the application. In some implementations, the transmitting wireless device may further segment IP packets, such as IP packets 311a, 311b, and 311c, into smaller IP packet fragments. In some implementations, the transmitting wireless device may enforce various quality of service (QoS) requirements with respect to packets of traffic flow 300, such as a guaranteed bit rate (GBR), a packet delay budget (PDB), and/or a packet error rate (PER), among other examples. In some implementations, the transmitting wireless device may establish a delivery deadline for packets. For example, the transmitting wireless device may establish the delivery deadline as the time of arrival (ToA) of the packet plus the PDB of the traffic flow to which the packet belongs.

In some examples in which a gNB 105 is transmitting the data, the gNB 105 may input the data to a protocol stack as SDUs for conversion to protocol data units (PDUs) for communication via the wireless transmission medium. For example, transmit processor 220 of gNB 105 may implement a protocol stack operable to provide conversion of data from SDUs to PDUs. As described above, segmentation of the data can occur within the protocol stack at the RLC layer. For example, if an RLC SDU is too large to fit within an RLC PDU size indicated by the PHY layer, then the RLC layer may segment the SDU across multiple PDUs. Typically, the RLC PDU size depends on the size of the TB used by the PHY layer to package the data for transmission via the wireless medium. The TB size is typically determined, for example, to be the number of bits that can be transmitted within the resources allocated within one slot by the gNB scheduler (for example, scheduler 244 of FIG. 2).

Segmentation of the data to be transmitted can additionally or alternatively occur within the protocol stack at the PHY layer. For example, if a TB is too large to fit within the maximum codeblock (CB) size used at the PHY layer, the TB may be segmented into multiple CBs. In such cases, the acknowledgment (ACK)/negative acknowledgment (NACK) could happen at the TB-level or at the level of a codeblock group (CBG). A retransmission of a TB may include only a subset of the CBGs from the original transmission (for example, only those CBGs that were NACKed) if the ACK/NACK is at the CBG-level. A CBG Transmission Information (CBGTI) field, such as may be provided in the downlink control information (DCI), may convey the set of CBGs that are being retransmitted.

The media access control (MAC) of a gNB 105 that is transmitting the data may provide an RLC PDU size that is insufficient to hold a file, such as relatively large files of video streaming or XR applications. For example, the resources allocated within a single slot of a frame (for example, superframe, frame, or subframe, among other examples, referred to herein generally as "frames") may result in a TB size that is smaller than an entire file. The above mentioned slot of a frame (also referred to herein as a frame slot) may, for example, be a time slot of a frame. If the TB size is smaller than an entire file and if an RLC SDU contains the entire file, the result may be that the file is segmented across multiple RLC PDUs and multiple TBs. However, aspects of the present disclosure control segmentation so as to occur at the PHY layer instead of the RLC layer, which may facilitate optimizing or otherwise improving the overall delivery of the entire file. For example, the RLC layer has a slower timescale for recovering from link errors compared to the PHY layer so that controlling segmentation to occur at the PHY layer rather than the RLC layer according to aspects herein may facilitate completed delivery of a file in less time.

In some aspects of the present disclosure, the size of a TB is not necessarily limited to the number of bits that can be transmitted within a single slot, such as a time slot of a frame. Instead, the multi-slot TBs disclosed herein are allowed to span multiple slots. For example, wireless devices operating in a wireless communications system may utilize a multi-slot TB configuration, such as for communications of data between base stations and UEs. In some aspects, multi-slot TBs implemented in accordance with concepts presented herein may facilitate the communication of large payloads, for example, because the multi-slot TB may fully accommodate an entire RLC SDU without segmentation by the RLC layer.

Figure 4A:
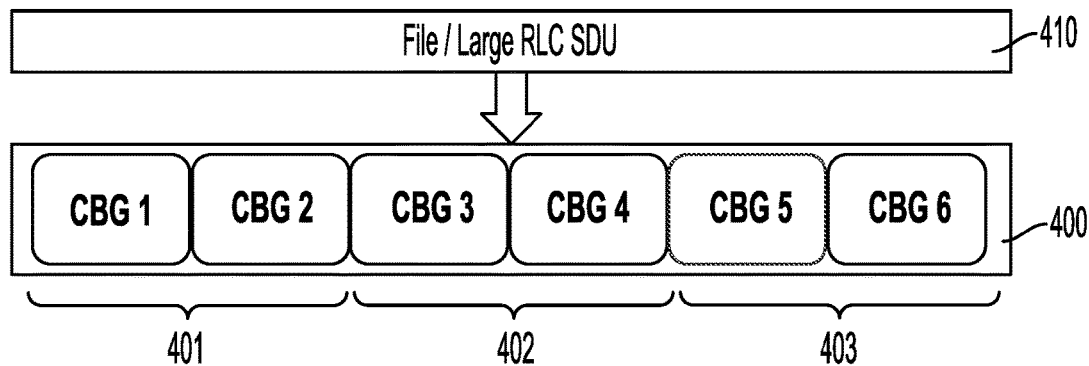
FIG. 4A shows an example of mapping a large transport block (TB) across multiple slots according to implementations of the present disclosure.

FIG. 4A shows an example of mapping a large TB, shown as multi-slot TB 400, across multiple slots, shown as slots 401, 402, and 403, according to some implementations of the present disclosure. Slots 401, 402, and 403 may, for example, be time slots of a frame used in transporting data packets between wireless devices (for example, a gNB 105 and a UE 115) of wireless network 100.

In the example of FIG. 4A, file 410 may be contained in a large RLC SDU (for example, a file associated with an application comprising data source 212) processed by the RLC layer of the protocol stack of the wireless device transmitting the file. In some aspects, during operation, a scheduler (for example, scheduler 224) of a wireless device (for example, gNB 105) transmitting file 410 provides a size of the multi-slot TB 400 (the "multi-slot TB size") to the MAC layer implemented by the wireless device for controlling access to the wireless transmission medium (for example, the MAC layer implemented by transmit processor 220). The multi-slot TB size may be determined, such as by controller/processor 240 and scheduler 244, based upon historical file sizes, file sizes of data queued for transmission, channel conditions, modulation and coding scheme (MCS) to be utilized for the data transmission, among other examples. The multi-slot TB size may, for example, be large enough to accommodate file 410 such that segmentation by the RLC layer is not required. In accordance with some aspects, the wireless device, such as gNB 105, also determines the number (C) of CBs to be included in the multi-slot TB 400. The wireless device may determine the number of CBs based upon the multi-slot TB size and the CB size. CB size may be determined (for example, by scheduler 244) based upon various factors (for example, code rate, modulation and coding scheme, maximum CB size set by a communication standard, among other examples).

According to aspects of the disclosure, the PHY layer segments the multi-slot TB 400 over the multiple slots 401, 402, and 403 of the multi-slot TB configuration. As shown in FIG. 4A, a CBG-based mechanism may be used to transport the data of file 410, or other large RLC SDU, within the multi-slot TB 400. In some aspects, the PHY layer of the protocol stack segments the data of file 410 over slots 401, 402, and 403 of multi-slot TB 400 using multiple CBGs (shown as CBG1, CBG2, CBG3, CBG4, CBG5, and CBG6, such as may be based upon the maximum CB size selected for the data flow), each including one or more CBs. The CBGs of multi-slot TB 400 mapped to any particular slot (for example, CBG1 and CBG2 mapped to slot 401, CBG3 and CBG4 mapped to slot 402, and CBG 5 and CBG 6 mapped to slot 403) are referred to herein as a TB segment. As such, the example shown in FIG. 4A includes three TB segments (for example, a first TB segment including CBG1 and CBG2 of slot 401, a second TB segment including CBG3 and CBG4 of slot 402, and a third TB segment including CBG5 and CBG6 of slot 403).

While FIG. 4A shows an example that includes six CBGs, CBG1, CBG2, CBG3, CBG4, CBG5, and CBG6, three corresponding TB segments, and two CBGs per TB segment, other configurations are possible. For example, the number of CBGs utilized with respect to a multi-slot TB configuration may be more or less than the six CBGs shown in the example of FIG. 4A, and may depend upon various factors (for example, the size of files to be transported or the CB size, among other examples). Additionally, the CBGs may be mapped to the slots of a multi-slot TB such that there are more or less than three TB segments and/or more or less than two CBGs per TB segment. The number of slots a multi-slot TB spans may be more or less than the three slots (slots 401, 402, and 403) shown in the example of FIG. 4A. The particular number of slots present in any particular multi-slot TB may depend upon various factors (for example, the size of the file to be transmitted, channel conditions, the modulation and coding scheme used, the upper limit of slots that may be accommodated, among other examples).

A multi-slot TB configuration may, however, be subject to an upper limit with respect to a number of slots over which the multi-slot TB can span. The maximum number of slots per multi-slot TB can impact the amount of signaling used to convey the number of TB segments in the multi-slot TB. In an example, 3 bits may be allocated to indicate the number of segments. In this example the multi-slot TB is at most 2^3=8 TB segments, and correspondingly the maximum number of slots per multi-slot TB would be 8. The upper limit resulting from the maximum number of slots per multi-slot TB may provide a multi-slot TB configuration that is unable to accommodate some payloads, such as extremely large files. If a payload is too large to include within a multi-slot TB, such as where the entire RLC SDU cannot fit within the RLC PDU, then the file may be segmented at the RLC layer (for example, in addition to being segmented at the PHY layer for use of multi-slot TBs) according to some aspects of the disclosure.

A maximum number (M) of CBGs in the multi-slot TB may be determined (for example, by controller/processor 240 and scheduler 244) as M=min(N,C), where C is the number of CBs across all TB segments and N is the maximum number of CBGs per multi-slot TB across all TB segments. The maximum number of CBGs in the multi-slot TB can impact the amount of signaling used to convey the CBGs in the multi-slot TB. In some examples, the maximum number of CBGs per multi-slot TB may also directly impact the signaling overhead in the DCI because the maximum number of CBGs is also the size of the CBGTI field where the CBGTI includes a bitmap of the CBGs per multi-slot TB across all TB segments. Similar to the example above in which 3 bits may be used to indicate the number of segments of multi-slot TB, 3 bits may be allocated to indicate the number of CBGs according to an example. In this example the maximum number of CBGs in the multi-slot TB is at most 2^3=8 CBGs (that is, M=8 in this example). In some examples, the first mod(C,M) CBGs of a multi-slot TB have ceil(C/M) CBs each, and the remaining CBGs of the multi-slot TB have floor(C/M) CBs each. In some other examples, a maximum (N') of CBGs per TB segment and a maximum number (K') of TB segments per multi-slot TB may be determined for a multi-slot TB configuration, instead of determining maximum number (M) of CBGs per multi-slot TB. In this case, the CBGTI field size may be N'*K'.

The wireless device (for example, by controller/processor 240 and scheduler 244) may determine the resource allocation for each TB segment of the multi-slot TB 400 so as to include one or more whole CBGs in each TB segment. For example, a wireless device may implement rules-based control (for example, implemented or controlled by one or more of controller/processor 240 and transmit processor 220) with respect to mapping CBG1, CBG2, CBG3, CBG4, CBG5, and CBG6 and their CBs to multi-slot TB 400. In accordance with some aspects, a multi-slot TB configuration mapping rule may provide control for mapping a whole number of CBs to each of slots 401, 402, and 403 based on the resources allocated. That is, the CBs in each respective CBG of CBG1, CBG2, CBG3, CBG4, CBG5, and CBG6 of multi-slot TB 400 may be entirely contained within a corresponding slot. In operation of this mapping rule, individual instances of the CBs are not split across slots 401, 402, and 403 of multi-slot TB 400. Another multi-slot TB configuration mapping rule may provide control for mapping the CBs to CBG1, CBG2, CBG3, CBG4, CBG5, and CBG6 such that two CBs mapped to two different ones of slots 401, 402, and 403 are not in the same CBG of CBG1, CBG2, CBG3, CBG4, CBG5, and CBG6. That is, all the CBs in each respective CBG may be mapped to a same corresponding slot of slots 401, 402 and 403. In operation of this mapping rule, individual instances of CBG1, CBG2, CBG3, CBG4, CBG5, and CBG6 are not split across slots 401, 402, and 403 of multi-slot TB 400.

The wireless device transmitting the file 410 may signal (for example, using one or more of transmit processor 220 and receive processor 258, such as under control of controller/processor 240 and controller/processor 280) aspects of the configuration of the multi-slot TB 400, such that the receiving wireless device is able to decode the data and reconstruct the file 410. As described above, the CBs carrying the data of the file 410 are mapped on different slots 401, 402, and 403 and the multi-slot TB size is computed based on the resources across the multiple slots 401, 402, and 403 according to aspects of the disclosure. The transmitting wireless device also transmits signaling identifying the CBs within each of slots 401, 402, and 403 to the receiving wireless device in association with transmission of multi-slot TB 400 according to some aspects.

Figure 4B:
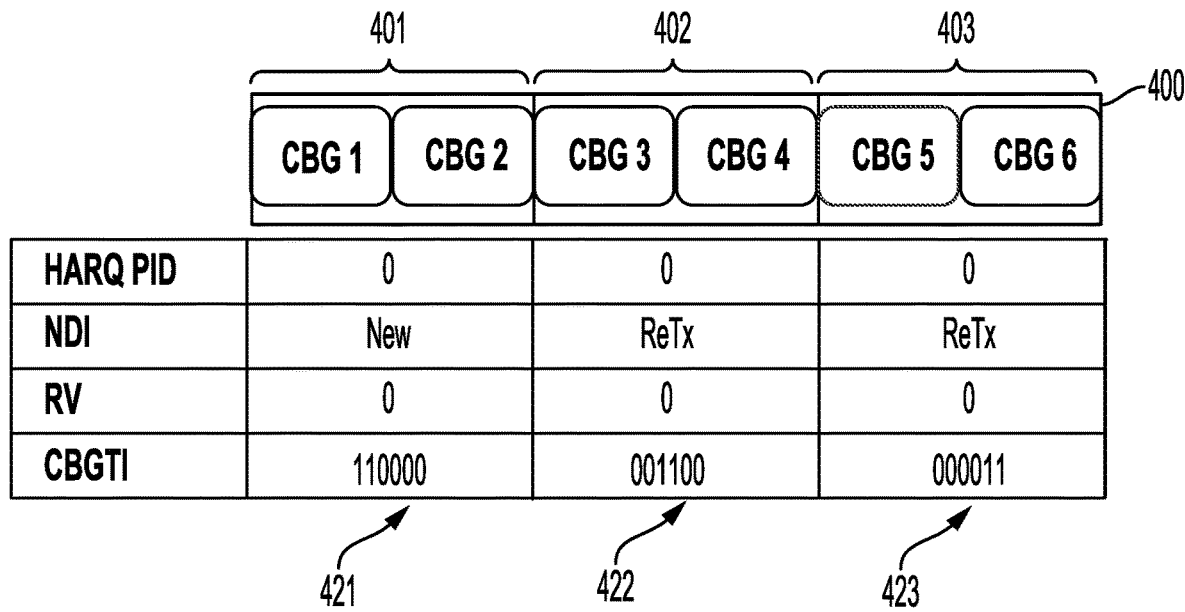
FIG. 4B shows signaling providing information configured to identify the codeblocks (CBs) as CBs of the multi-slot TB for decoding by a receiving wireless device according to some implementations of the present disclosure.

FIG. 4B shows example signaling by a transmitting wireless device that facilitates identification and decoding of CBs of the multi-slot TB 400 by a receiving wireless device according to some implementations of the present disclosure. The signaling may include DCI transmitted in association with transmitting the multi-slot TB 400 that identifies the CBs in each slot of the multi-slot TB 400. For example, the signaling may include DCI for each respective slot (shown as DCI 421 associated with slot 401, DCI 422 associated with slot 402, and DCI 423 associated with slot 403). As shown in FIG. 4B, the DCI 421, 422, and 423 may include, for respective slots 401, 402, and 403, a hybrid automatic repeat request (HARQ) process identifier (PID), a new data indicator (NDI), a redundancy version (RV), and CBG transmission information (CBGTI), or a combination of some or all of these.

In some examples, the same HARQ PID may be used for all CBGs (CBG1, CBG2, CBG3, CBG4, CBG5, and CBG6) of multi-slot TB 400 to indicate that the CBGs are part of the same file 410. In some such examples, CBG1, CBG2, CBG3, CBG4, CBG5, and CBG6 of multi-slot TB 400 may also share a same RV because they are all associated with the first HARQ transmission. For example, as shown in FIG. 4B, the DCI corresponding to slots 401, 402, and 403 of multi-slot TB 400 use the same HARQ PID (shown as "0" for slots 401, 402, and 403) and RV (shown as "0" for slots 401, 402, and 403).

The NDI of the first slot (slot 401) to which multi-slot TB 400 is mapped may be toggled or otherwise set to indicate CBG1 and CBG2 as new data to convey that slot 401 is the start of a new multi-slot TB. The NDI of subsequent slots (slots 402 and 403) to which multi-slot TB 400 is mapped may be set to indicate CBG3, CBG4, CBG5 and CBG6 as retransmission data or as other than new data, despite being the first HARQ transmission of these CBGs and despite not being retransmissions, to convey that slots 402 and 403 are part of multi-slot TB 400 and to ensure that the data is not discarded. For example, DCI 421 corresponding to slot 401 has the NDI set as "New", while DCI 422 and 423 corresponding to slots 402 and 403, respectively, have the NDI set as "ReTx" to indicate retransmission, although the data in slots 402 and 403 is actually not part of a retransmission.

In some examples, the content of the transmission in each of slots 401, 402, and 403 of multi-slot TB 400 may be indicated using CBGTI. The CBGTI may, for example, comprise a bitmap having a field size of N (the maximum number of CBGs per multi-slot TB across all TB segments)

indicating the presence of individual CBGs in multi-slot TB 400). For example, DCI 421, 422, and 423 corresponding to slots 401, 402, and 403, respectively, of multi-slot TD 400 may include the CBGTI. In the example of FIG. 4B, the CBGTI for each particular slot identifies the CBGs transported in the slot (shown as "110000" for indicating CBG1 and CBG2 in slot 401, "001100" for indicating CBG3 and CBG4 in slot 402, and "000011" for indicating CBG5 and CBG6 in slot 403). In this example, the CBGTI may be provided in association with the initial transmission of the CBGs, rather than being used only in association with retransmission of CBGs.

It should be appreciated that, additional or even alternative information may be provided in association with multi-slot TB 400, although such additional or alternative information is not expressly shown in FIG. 4B. For example, DCI may include an indication of an MCS or other transmission parameters.

A wireless device (for example, a UE 115) receiving multi-slot TB 400 may use the information in the DCI conveyed with each of the slots 401, 402, and 403 to identify the CBs (for example, implementing or under control of one or more of controller/processor 280 and receive processor 258), so that it may decode the data transported in the multi-slot TB 400 and reconstruct the file 410.

For each slot, k, (slots 401, 402, and 403 in the example of FIGS. 4A and 4B) transporting a TB segment, the receiving wireless device may determine the respective TB segment size and the number ($C_k$) of CBs in the $k^{th}$ slot based on the respective DCI for the slot. The receiving wireless device may determine a maximum number (N) of CBGs in the multi-slot TB 400 across all segments, and correspondingly the CBGTI field size, using configuration information (for example, as provided by the wireless device transmitting the multi-slot TB 400, such as through radio resource control (RRC) or other signaling). The wireless device receiving multi-slot TB 400 may identify an initial TB segment of the multi-slot TB using the CBGTI field of the DCI 421 in combination with the NDI field of the DCI 421 indicating new data. Subsequent TB segments of multi-slot TB 400 may be identified by the receiving wireless device using the CBGTI field of a respective one of the DCI 422 and 423 in combination with the NDI field of the respective one of the DCI 422 and 423 indicating other than new data (for example, indicating retransmission). The CBGTI may, for example, comprise a bitmap of field size N indicating presence of CBGs of a TB segment of multi-slot TB 400. The number of CBGs ($M_k$) in the $k^{th}$ TB segment may be obtained from the CBGTI in the DCI (DCI 421, 422, and 423) of the $k^{th}$ slot (slots 401, 402, and 403). In some examples, the first mod($C_k$, $M_k$) CBGs within a slot of slots 401, 402, and 403 may have ceil($C_k/M_k$) CBs each, while the remaining CBGs within this slot may have floor($C_k/M_k$) CBs each.

Various techniques may be utilized for indicating or determining that all of the CBGs of a multi-slot TB have been completely decoded and otherwise processed. For example, information in the DCI transmitted with each of the slots 401, 402, and 403 may indicate the number of TB segments of the multi-slot TB 400. Additionally or alternatively, the DCI transmitted with a final slot (e.g., slot 403) may include a bit to indicate the last TB segment of the multi-slot TB 400.

Aspects of the multi-slot TB configurations disclosed herein enable flexibility with respect to transmission of the data transported by multi-slot TB 400. For example, the PHY layer of the transmitting wireless device may change the MCS between TB segments of the multiple TB segments of multi-slot TB 400. A change in channel or interference conditions or a change in the scheduling decision in terms of which other users are scheduled (for example, in case of MU-MIMO) may, for example, result in a change of the MCS. In one example, a UE may report channel-state information (CSI) between one TB segment and the next, resulting in a base station selecting a new MCS. Multi-slot TB configurations may accommodate such MCS changes between the slots of the multi-slot TB 400. Additionally or alternatively, there may be a change of the RV between CBGs of TB segments of the multiple TB segments of multi-slot TB 400. For example, different RVs may be indicated for CBGs of a slot of a multi-slot TB in a TB segment that includes a retransmission of a failed CBG with the first transmission of a new CBG.

As another example of the flexibility afforded by aspects of the multi-slot TB configuration described herein, the CBG sizes may be kept the same across TB segments or may be different across TB segments. In such latter implementations, the transmitting wireless device may also transmit signaling to indicate the CBG sizes for the different TB segments. For example, in a first mode, a wireless device may determine the CBG sizes before the resource allocation. In this case, the CBGs may be equal in size, except for rounding one or more of the CBGs to the next integer, and a slot may be allocated certain whole number of CBGs depending on the resources allocated in each slot. In another example, in a second mode, a wireless device may make the resource allocation before the CBG sizes are determined. In this case, a wireless device may determine the CBG size, for each slot, based on the allocated resources and a predetermined number of CBGs per slot. These CBG sizes could vary from one slot or TB segment to the next.

Figures 5, 6:
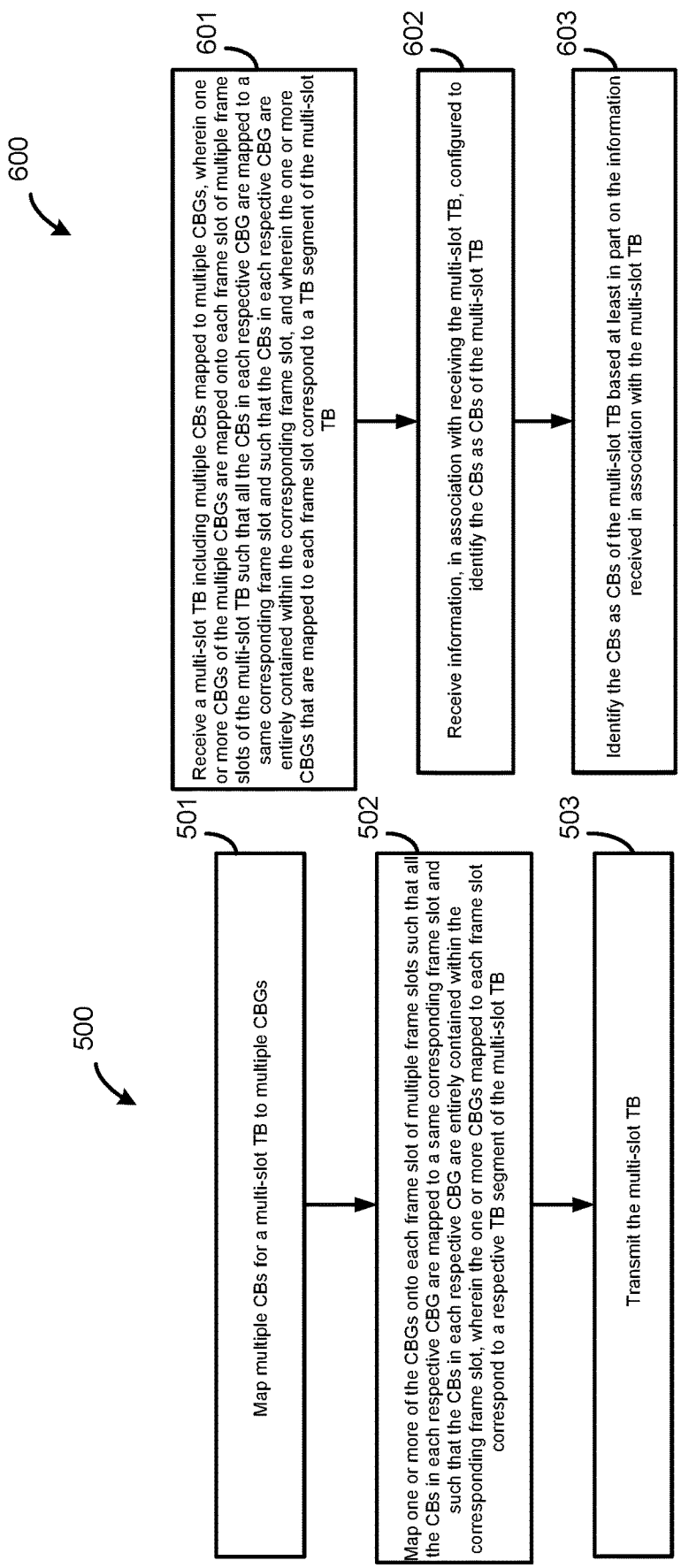
FIG. 5 is a flow diagram showing example operation for transmitting a multi-slot TB according to some implementations of the present disclosure.
FIG. 6 is a flow diagram showing example operation for receiving a multi-slot TB according to some implementations of the present disclosure.

FIG. 5 is a flow diagram showing example operation for transmitting multi-slot TB 400 according to some implementations of the present disclosure. For example, a wireless device, such as a gNB 105, transmitting multi-slot TB 400 may perform the functions of flow 500 shown in FIG. 5.

In block 501 of the example flow 500, the transmitting wireless device maps multiple CBs for a multi-slot TB to multiple CBGs. In block 502, the transmitting wireless device maps one or more of the CBGs onto each frame slot of the multiple frame slots such that all the CBs in each respective CBG are mapped to the same corresponding frame slot and such that the CBs in each respective CBG are entirely contained within the corresponding frame slot. In some examples of flow 500, the one or more CBGs mapped to each frame slot correspond to a respective TB segment of the multi-slot TB. In some examples, mappings may be indicated by rules-based mapping of CBGs and their CBs to a multi-slot TB, such as using the rules-based control described above with reference to FIG. 4A.

In some examples, the transmitting wireless device may then transmit the multi-slot TB to a receiving wireless device, such as a UE 115, in block 503. The transmitting wireless device may transmit the multi-slot TB as multiple TB segments transported in multiple frame slots.

FIG. 6 is a flow diagram showing example operation for receiving a multi-slot TB according to some implementations of the present disclosure. For example, a wireless device, such as a UE 115, receiving multi-slot TB 400 may perform the functions of flow 600 shown in FIG. 6.

In block 601 of the example flow 600, the receiving wireless device receives a multi-slot TB including multiple CBs mapped to multiple CBGs. A wireless device may map one or more CBGs of the multiple CBGs onto each frame slot of multiple frame slots of the multi-slot TB such that all the CBs in each respective CBG are mapped to a same corresponding frame slot and such that the CBs in each respective CBG are entirely contained within the corresponding frame slot. In accordance with the example of flow 600, a wireless device mapped the one or more CBGs to each frame slot corresponding to a respective TB segment of the multi-slot TB.

In block 602, which may be performed before, after, or in parallel with block 601, the receiving device receives information, in association with receiving the multi-slot TB, that identifies the CBs as CBs of the multi-slot TB. For example, the receiving wireless device may receive DCI in block 602 that identifies the CBs as CBs of the multi-slot TB.

The receiving wireless device may then identify, in block 603, the CBs as CBs of the multi-slot TB based at least in part on the information received in association with the multi-slot TB in block 602. For example, DCI 421, 422, and 423 received in association with the TB segments of multi-slot TB 400 in block 602 may be used to identify the CBs as CBs of the multi-slot TB.

Figure 7:
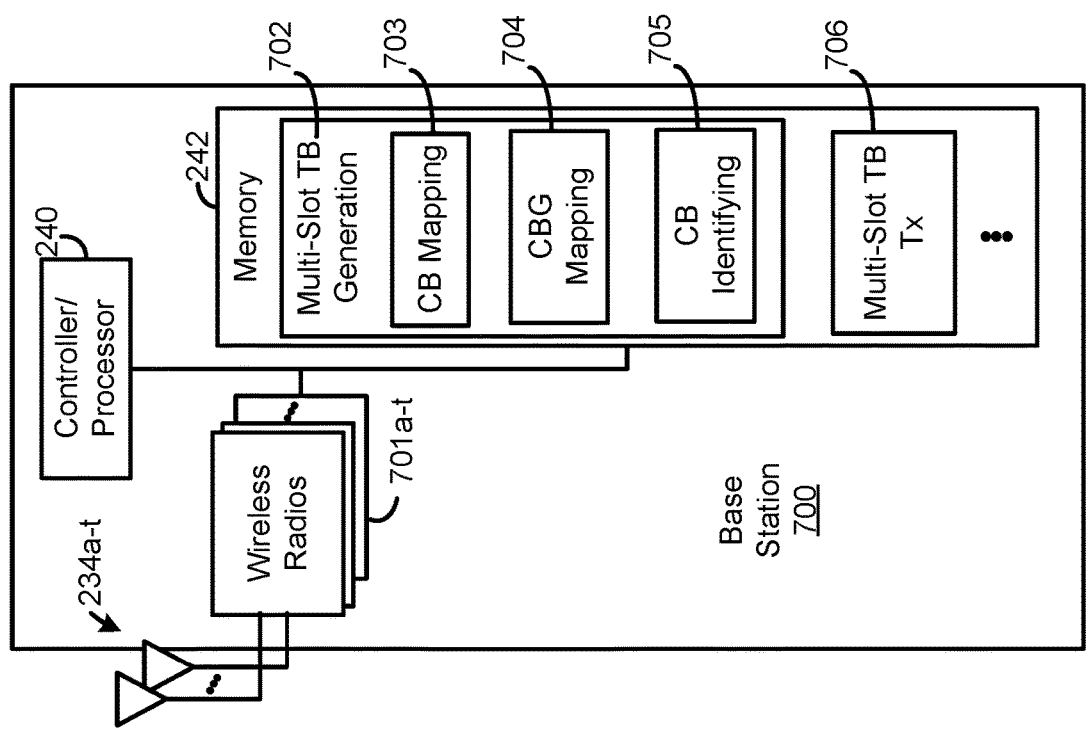
FIG. 7 is a block diagram illustrating example components of a base station according to some implementations of the present disclosure.

FIG. 7 is a block diagram illustrating example components of a base station 700 according to some implementations of the present disclosure. Base station 700, which may be an example of a gNB 105 (described with reference to FIG. 2), may include a controller/processor 240, a memory 242, and antennas 234a through 234t, as described above. Base station 700 may also have wireless radios 701a to 701t that include additional components, such as transmit processor 220, TX MIMO processor 230, and MODs 232a to 232t, also described above with reference to FIG. 2. Memory 242 of base station 700 stores one or more algorithms that configure processor/controller 240, transmit processor 220, or a combination of processor/controller 240 and transmit processor 220 to carry out one or more procedures, such as those described above with reference to FIG. 5.

One or more algorithms stored by memory 242 configure processor/controller 240, transmit processor 220, or a combination of processor/controller 240 and transmit processor 220 to carry out one or more operations relating to wireless communication by the base station 700, as previously described. For example, multi-slot TB generation logic 702 may carry out operations to generate multi-slot TBs as described with reference to FIGS. 4A, 4B, and 5. For example, CB mapping logic 703 of multi-slot TB generation logic 702 may execute operations to map multiple CBs for multi-slot TBs to multiple CBGs, as described with reference to block 501 of the flow 500 of FIG. 5. Additionally, CBG mapping logic 704 of multi-slot TB generation logic 702 may execute operations to map one or more CBGs onto frame slots of multiple frame slots of multi-slot TBs, as described with reference to block 502 of the flow 500 of FIG. 5. In some examples, CB mapping logic 703 and CBG mapping logic 704 may implement rules-based control with respect to mapping of CBGs and their CBs to a multi-slot TB, as described with reference to FIG. 4A.

In some implementations, multi-slot TB generation logic 702 may provide functionality in addition to or in the alternative to those of CB mapping logic 703 and CBG mapping logic 704. For example, multi-slot TB generation logic 702 may include CB identifying logic 705 for generation of information configured to identify the CBs as CBs of the multi-slot TB (for example, the DCI of the example in FIG. 4B).

Multi-slot TB transmission logic 706 may carry out operations to transmit multi-slot TBs generated by multi-slot TB generation logic 702 according to aspects of the disclosure, as described with reference to block 503 of flow 500 of FIG. 5. For example, multi-slot TB transmission logic 706 may control one or more of wireless radios 701a to 701t to transmit TB segments of a multi-slot TB in multiple frame slots.

In some implementations, multi-slot TB transmission logic 706 may provide functionality in addition to or in the alternative to transmission of multi-slot TBs. For example, multi-slot TB transmission logic 706 may control one or more of wireless radios 701a to 701t to transmit information configured to identify the CBs as CBs of the multi-slot TB in association with transmission of the multi-slot TBs.

In some implementations, base station 700 may provide for other multi-slot TB configuration functions in addition to the multi-slot TB generation and transmission of multi-slot TBs just described.

Figure 8:
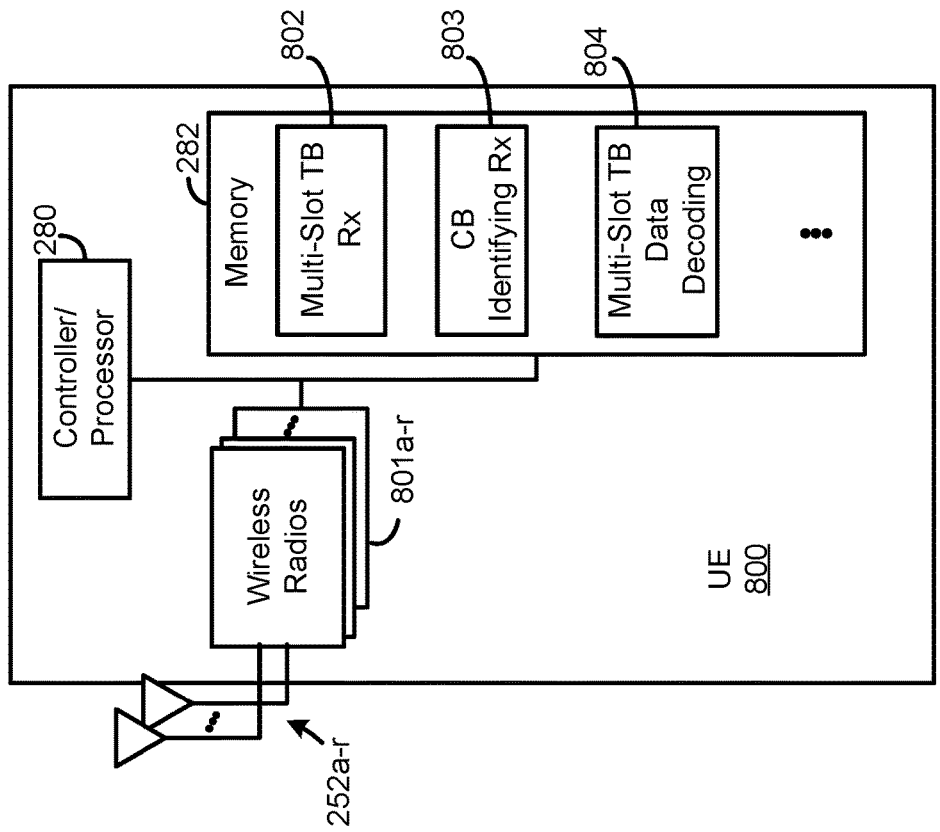
FIG. 8 is a block diagram illustrating example components of a user equipment (UE) according to some implementations of the present disclosure.

FIG. 8 is a block diagram illustrating example components of a UE 800 according to some implementations of the present disclosure. UE 800, which may be an example of a UE 115 (described with reference to FIG. 2), may include a controller/processor 280, a memory 282, and antennas 252a through 252r, as described above. UE 800 may also have wireless radios 801a to 801r that include additional components, such as DEMODs 254a to 254r, MIMO detector 256, and receive processor 258, also described above with reference to FIG. 2. Memory 282 of UE 800 stores one or more algorithms that configure processor/controller 280, receive processor 258, or a combination of processor/controller 280 and receive processor 258 to carry out one or more procedures, such as those described above with reference to FIG. 6.

One or more algorithms stored by memory 282 configure processor/controller 280, receive processor 258, or a combination of processor/controller 280 and receive processor 258 to carry out one or more procedures relating to wireless communication by the UE 800, as previously described. For example, multi-slot TB receiving logic 802 may carry out operations to receive multi-slot TBs according to aspects of the disclosure, as described with reference to block 601 of flow 600 of FIG. 6. For example, multi-slot TB receiving logic 802 may control one or more of wireless radios 801a to 801r to receive TB segments of a multi-slot TB in multiple frame slots. CB identifying logic 803 may carry out operations to receive information configured to identify the CBs as CBs of the multi-slot TB, as described with reference to block 602 of FIG. 6. For example, CB identifying logic 803 may control one or more of wireless radios 801a to 801r to receive information in association with TB segments of a multi-slot TB that identify the CBs as CBs of the multi-slot TB (for example, the DCI of the example in FIG. 4B). CB identifying logic 803 may carry out operations to identify the CBs as CBs of the multi-slot TB based at least in part on the received CB identifying information, as described with reference to block 603 of flow 600 of FIG. 6. For example, CB identifying logic 803 may analyze information received in association with the multi-slot TB to identify the CBs as CBs of the multi-slot TB.

In some implementations, UE 800 may provide for multi-slot TB functions in addition to multi-slot TB receiving and CB identifying. For example, UE 800 may include multi-slot TB data decoding logic 804 to carry out operations to extract data from the CBs of a multi-slot TB for reconstructing a file.

Figure 9A:
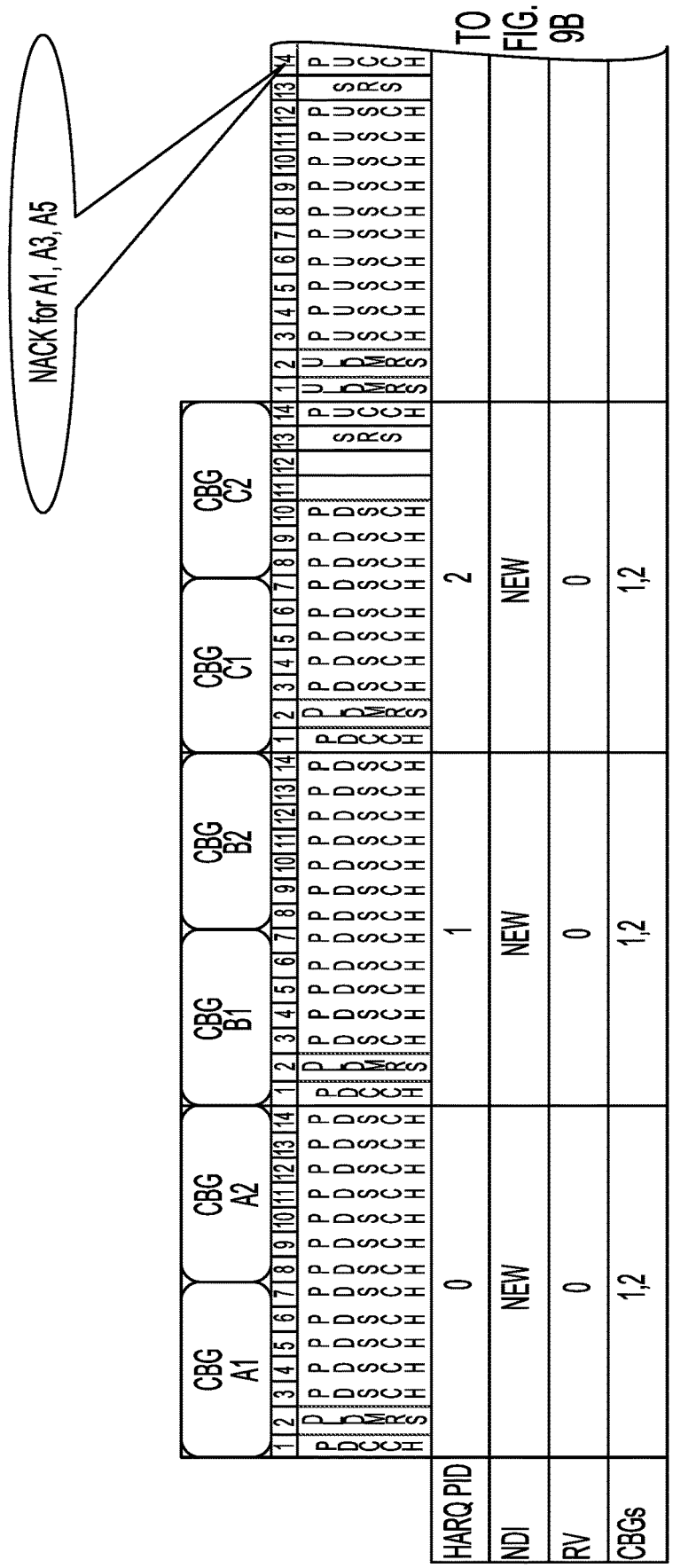
Figure 9B:
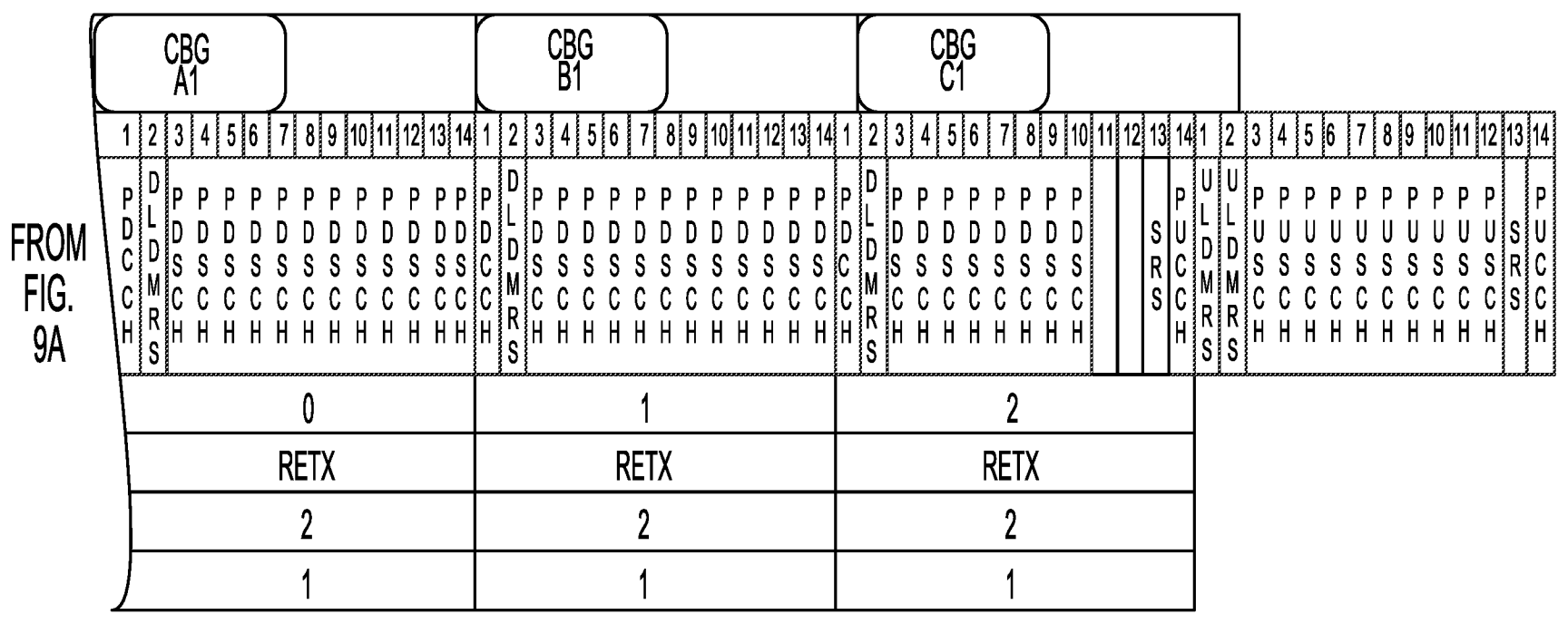
Figure 10A:
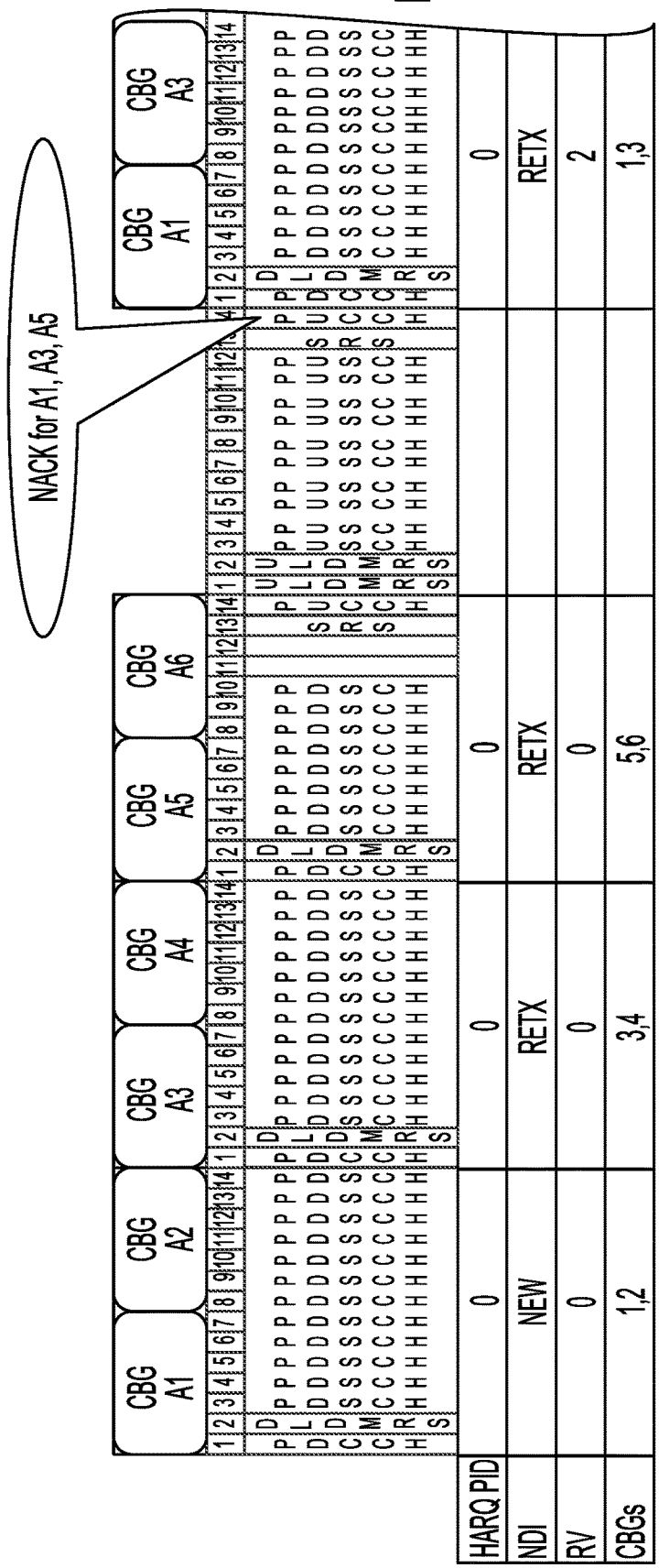
FIGS. 10A and 10B show an example of retransmission in association with the use of CBGs of a multi-slot TB configuration according to some implementations of the present disclosure.
Figure 10B:
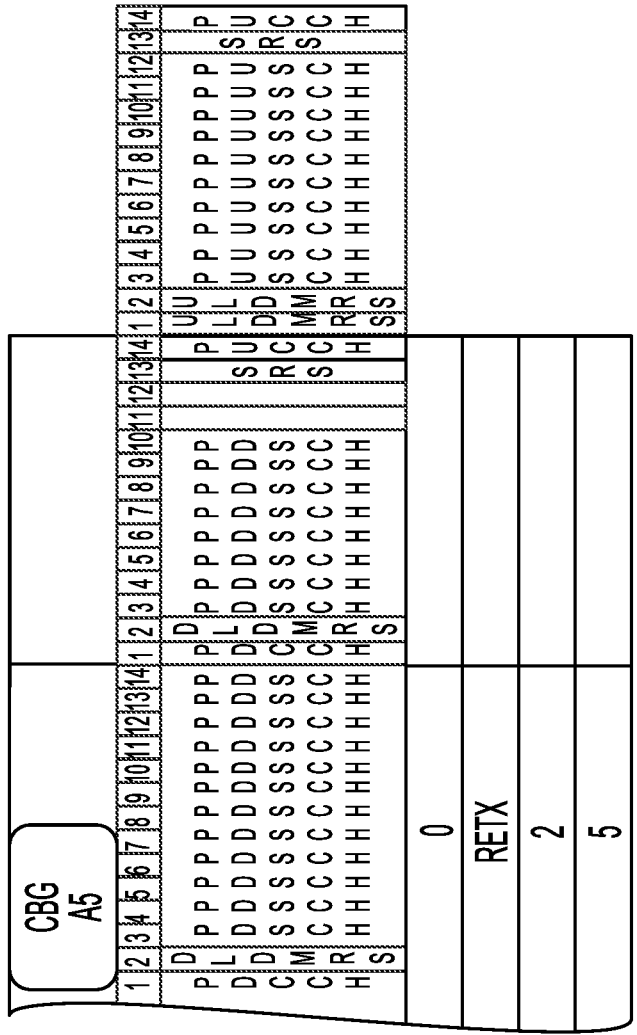
Figure 11A:
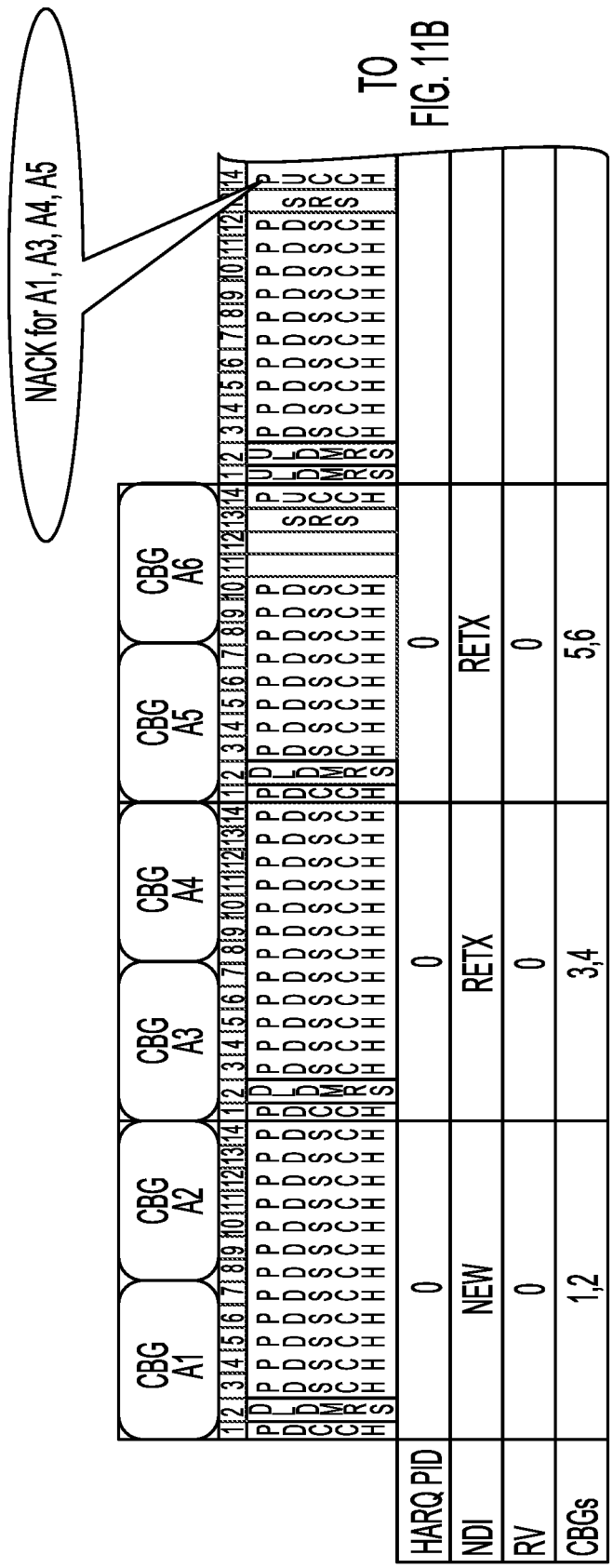
Figure 11B:
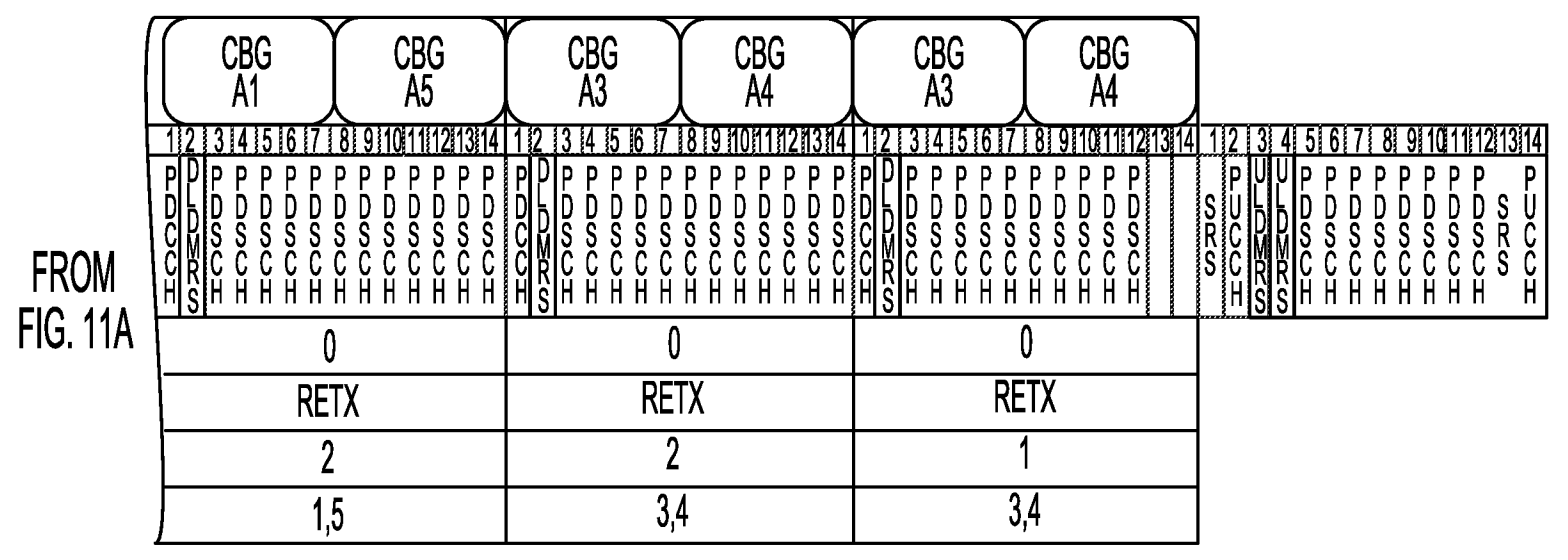

Utilization of a multi-slot TB configuration according to aspects of the present disclosure facilitates optimizing or otherwise improving the overall delivery of an entire file. Some examples also provide flexibility with respect to retransmissions, lower latency, among other examples. FIGS. 9A and 9B shows a baseline example of retransmission in association with traditional use of CBGs. FIGS. 10A and 10B and FIGS. 11A and 11B show examples of retransmission in association with the use of CBGs of a multi-slot TB configuration according to some implementations of the present disclosure. As can be seen in the baseline example of FIGS. 9A and 9B, where CBGs (shown as CBG A1, CBG B1, and CBG C1) of different slots are not recoverable by a receiving wireless device (shown as being NACKed), those CBGs are retransmitted in corresponding retransmission slots. In contrast, as shown in the multi-slot TB configuration example of FIGS. 10A and 10B, the CBG A1, CBG B1, and CBG C1 are retransmitted in a multi-slot TB resulting in less latency in receiving the retransmitted CBGs. As shown in the multi-slot TB configuration of FIGS. 11A and 11B, flexibility may be provided with respect to one or more aspect of the multi-slot TB. For example, where link conditions on some resources are worse than other resources, retransmission of some CBGs (shown as CBG A3 and CBG A4) may be configured different than retransmission of other CBGs (shown as CBG A1 and CBG A5). In the example, of FIGS. 11A and 11B, CBG A3 and CBG A4 are transported in a same slot of the multi-slot TB and both CBGs failed (shown as NACKed), while CBG A1 and CBG A5 of other slots experienced a lower failure rate. In this case, the retransmissions may include more repetitions (for example, different RVs between different TB segments) of CBG A3 and CBG A4.

It should be understood that, although examples have been discussed above with reference to wireless device transmitting multi-slot TBs comprising a gNB or other base station implementation and a wireless device receiving multi-slot TBs comprising a UE or other terminal devises, concepts of the present disclosure apply to transmission of multi-slot TBs between other devices, network nodes, combinations of devices, etc. For example, a UE may transmit data in an uplink using a multi-slot TB according to some aspects of the disclosure.

In some examples of methods, the apparatuses, and articles including non-transitory computer-readable medium described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for mapping a plurality of CBs for a multi-slot TB to a plurality of codeblock groups CBGs, mapping a plurality of sets of one or more CBGs of the plurality of CBGs to a plurality of slots of the multi-slot TB, each set of CBGs being mapped to a respective slot of the plurality of slots such that all the CBs in each respective CBG are mapped to the respective slot and such that all the CBs in each respective CBG are entirely contained within the respective slot, and transmitting, to a receiving wireless device, the multi-slot TB including the plurality of CBs over the plurality of slots, each set of CBGs corresponding to a respective TB segment of a plurality of TB segments of the multi-slot TB.

2. The methods, apparatuses, and articles of clause 1, further providing for transmitting, to the receiving wireless device in association with transmitting the multi-slot TB, information identifying the CBs as CBs of the multi-slot TB for decoding by a receiving wireless device.

3. The methods, apparatuses, and articles of clause 2, wherein the information identifying the CBs as CBs of the multi-slot TB is provided in DCI.

4. The methods, apparatuses, and articles of any of clauses 2-3, wherein the information identifying the CBs as CBs of the multi-slot TB includes CBGTI indicating that the plurality of CBGs are CBGs of the multi-slot TB for identifying the plurality of CBs as CBs of the multi-slot TB.

5. The methods, apparatuses, and articles of any of clauses 2-4, wherein the information identifying the CBs as CBs of the multi-slot TB includes a same HARQ PID for all CBGs of the multi-slot TB for identifying the plurality of CBs as CBs of the multi-slot TB.

6. The methods, apparatuses, and articles of any of clauses 2-5, wherein the information identifying the CBs as CBs of the multi-slot TB includes a NDI for a first slot of the plurality of slots indicating the CBGs of the respective set of one or more CBGs mapped to the first slot as new data and a NDI for all subsequent slots of the plurality of slots indicating the CBGs of the respective sets of one or more CBGs mapped to the subsequent slots as other than new data for identifying the plurality of CBs as CBs of the multi-slot TB.

7. The methods, apparatuses, and articles of any of clauses 1-6, further providing for determining a size of the multi-slot TB such that the multi-slot TB accommodates a number of bits in excess of that which can be transmitted within a single slot, and determining a number of CBs of the plurality CBs for the multi-slot TB based at least in part upon the size of the multi-slot TB, wherein the number of CBs is a number of CBs across all TB segments of the multi-slot TB.

8. The methods, apparatuses, and articles of clause 7, wherein the size of the multi-slot TB is determined based at least in part on transmission scheduling and MCS.

9. The methods, apparatuses, and articles of any of clauses 1-8, further providing for determining a maximum number of CBGs for the multi-slot TB, wherein the maximum number of CBGs is a maximum number of CBGs across all TB segments of the multi-slot TB.

10. The methods, apparatuses, and articles of clause 9, further providing for determining a number of the CBGs the CBs for the multi-slot TB are mapped to based at least in part on the number of CBs determined for the multi-slot TB and the maximum number of CBGs determined for the multi-slot TB.

11. The methods, apparatuses, and articles of any of clauses 1-10, further providing for determining a resource allocation for each TB segment of the multi-slot TB such that each TB segment entirely contains one or more CBGs and the CBs mapped to a same CBG are mapped to the same frame slot.

12. The methods, apparatuses, and articles of any of clauses 1-11, further providing for transmitting, to the receiving wireless device in association with transmitting the multi-slot TB, information indicating whether all CBGs of the plurality of CBGs for the multi-slot TB have been completed.

13. The methods, apparatuses, and articles of clause 12, wherein the information indicating whether all CBGs of the CBGs for the multi-slot TB have been completed comprises DCI indicating at least one of a number of segments of the multi-slot TB or a last segment of the multi-slot TB.

14. The methods, apparatuses, and articles of any of clauses 1-13, further providing for determining a maximum number of CBGs per TB segment of the multi-slot TB, and determining a maximum number of TB segments per multi-slot TB, wherein the mapping of the CBGs onto the corresponding frame slots is in accordance with the determined maximum number of CBGs per TB segment and the determined maximum number of TB segments per multi-slot TB.

15. The methods, apparatuses, and articles of any of clauses 1-14, further providing for changing at least one of a MCS between TB segments of the multi-slot TB or a RV between CBGs of a TB segment of the multi-slot TB.

16. The methods, apparatuses, and articles of any of clauses 1-15, wherein the CBGs mapped to different TB segments of the multi-slot TB include different sized CBGs.

17. Methods, apparatuses, and articles for wireless communication may provide receiving, from a transmitting wireless device, a multi-slot TB including a plurality of CBs mapped to a plurality of CBGs, wherein a plurality of sets of one or more CBGs of the plurality of CBGs are mapped to a plurality of slots of the multi-slot TB, each set of CBGs being mapped to a respective slot of the plurality of slots such that all the CBs in each respective CBG are mapped to the respective slot and such that all the CBs in each respective CBG are entirely contained within the respective slot, receiving, from the transmitting wireless device in association with receiving the multi-slot TB, information identifying the CBs as CBs of the multi-slot TB, and identifying the CBs as CBs of the multi-slot TB based at least in part on the information received in association with the multi-slot TB.

18. The methods, apparatuses, and articles of clause 17, wherein the information received in association with the multi-slot TB comprises DCI identifying the CBs as CBs of the multi-slot TB.

19. The methods, apparatuses, and articles of any of clauses 17-18, wherein the information received in association with the multi-slot TB comprises CBGTI indicating the plurality of CBGs are CBGs of the multi-slot TB 20. The methods, apparatuses, and articles of any of clauses 17-19, wherein the information received in association with the multi-slot TB comprises a same HARQ PID for all CBGs of the multi-slot TB.

21. The methods, apparatuses, and articles of any of clauses 17-20, wherein the information received in association with the multi-slot TB comprises a NDI for a first slot of the plurality of slots indicating the CBGs of the respective set of one or more CBGs mapped to the first slot as new data and a NDI for all subsequent slots of the plurality of slots indicating the CBGs of the respective sets of one or more CBGs mapped to the subsequent slots as other than new data.

22. The methods, apparatuses, and articles of any of clauses 17-21, further providing for determining a size of a TB segment of the multi-slot TB and a number of CBs mapped to the frame slot of the TB segment based on DCI for the frame slot.

23. The methods, apparatuses, and articles of any of clauses 17-22, further providing for determining a maximum number of CBGs for the multi-slot TB, wherein the maximum number of CBGs is a maximum number of CBGs across all TB segments of the multi-slot TB 24. The methods, apparatuses, and articles of any of clauses 17-22, further providing for determining a number of the CBGs the CBs for a first TB segment are mapped to base at least in part on CBGTI associated with the slot of the first TB segment.

25. The methods, apparatuses, and articles of any of clauses 17-24, further providing for receiving, from the transmitting wireless device in association with the multi-slot TB, information indicating whether all CBGs of the CBGs for the multi-slot TB have been completed.

26. The methods, apparatuses, and articles of clause 25, wherein the information indicating whether all CBGs of the CBGs for the multi-slot TB have been completed comprises DCI indicating at least one of a number of segments of the multi-slot TB or a last segment of the multi-slot TB.

27. The methods, apparatuses, and articles of any of clauses 17-26, wherein at least one of a MCS is changed between TB segments of the multi-slot TB or a RV is changed between CBGs of a TB segment of the multi-slot TB.

28. The methods, apparatuses, and articles of any of clauses 17-27, wherein the CBGs mapped to different TB segments of the multi-slot TB include different sized CBGs.

A person having ordinary skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (for example, the functional blocks and modules in FIGS. 2, 7, and 8) may have processors, electronics devices, hardware devices, electronics components, logical circuits, memories, software codes, firmware codes, etc., or any combination thereof.

A person having ordinary skill in the art will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. A person having ordinary skill in the art may implement the described functionality in varying ways for each particular application, but such implementation decisions do not cause a departure from the scope of the present disclosure. A person having ordinary skill in the art will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, two or more microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above are also included within the scope of computer-readable media.

As used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The previous description of the disclosure is provided to enable any person having ordinary skill in the art to make or use the disclosure. Various modifications to the disclosure will be readily apparent to a person having ordinary skill in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a transmitting wireless device, the method comprising:
mapping a plurality of codeblocks (CBs) for a multi-slot transport block (TB) to a plurality of codeblock groups (CBGs), wherein the multi-slot TB comprises a plurality of frame slots of a transmission frame;
mapping a plurality of sets of one or more CBGs of the plurality of CBGs to the plurality of frame slots of the multi-slot TB, each set of CBGs being mapped to a respective frame slot of the plurality of frame slots such that all the CBs in each respective CBG are mapped to the respective frame slot and such that all the CBs in each respective CBG are entirely contained within the respective frame slot; and
transmitting, to a receiving wireless device, the multi-slot TB including the plurality of CBs over the plurality of frame slots, each set of CBGs corresponding to a respective TB segment of a plurality of TB segments of the multi-slot TB.

2. The method of claim 1, further comprising:
transmitting, to the receiving wireless device in association with transmitting the multi-slot TB, CBG transmission information (CBGTI) indicating that the plurality of CBGs are CBGs of the multi-slot TB for identifying the plurality of CBs as CBs of the multi-slot TB.

3. The method of claim 1, further comprising:
transmitting, to the receiving wireless device in association with transmitting the multi-slot TB, a same hybrid automatic repeat request (HARQ) process identifier (PID) for all CBGs of the multi-slot TB for identifying the plurality of CBs as CBs of the multi-slot TB.

4. The method of claim 1, further comprising:
transmitting, to the receiving wireless device in association with transmitting the multi-slot TB, a new data indicator (NDI) for a first frame slot of the plurality of frame slots indicating the CBGs of a respective set of one or more CBGs mapped to the first frame slot as new data and a NDI for all subsequent frame slots of the plurality of frame slots indicating the CBGs of respective sets of one or more CBGs mapped to the subsequent frame slots as other than new data for identifying the plurality of CBs as CBs of the multi-slot TB.

5. The method of claim 1, further comprising:
determining a size of the multi-slot TB such that the multi-slot TB accommodates a number of bits in excess of that which can be transmitted within a single frame slot; and
determining a number of CBs of the plurality of CBs for the multi-slot TB based at least in part upon the size of the multi-slot TB, wherein the number of CBs is a number of CBs across all TB segments of the multi-slot TB.

6. The method of claim 1, further comprising:
determining a maximum number of CBGs for the multi-slot TB, wherein the maximum number of CBGs is a maximum number of CBGs across all TB segments of the multi-slot TB.

7. The method of claim 1, further comprising:
transmitting, to the receiving wireless device in association with transmitting the multi-slot TB, information indicating whether all CBGs of the plurality of CBGs for the multi-slot TB have been completed.

8. The method of claim 1, wherein at least one of a modulation coding scheme (MCS) is changed between TB segments of the multi-slot TB, a redundancy version (RV) is changed between CBGs of a TB segment of the multi-slot TB, or the CBGs mapped to different TB segments of the multi-slot TB include different sized CBGs.

9. A method of wireless communication by a receiving wireless device, the method comprising:

receiving, from a transmitting wireless device, a multi-slot transport block (TB) including a plurality of codeblocks (CBs) mapped to a plurality of codeblock groups (CBGs), wherein the multi-slot TB comprises a plurality of frame slots of a transmission frame, and wherein a plurality of sets of one or more CBGs of the plurality of CBGs are mapped to the plurality of frame slots of the multi-slot TB, each set of CBGs being mapped to a respective frame slot of the plurality of frame slots such that all the CBs in each respective CBG are mapped to the respective frame slot and such that all the CBs in each respective CBG are entirely contained within the respective frame slot;

receiving, from the transmitting wireless device in association with receiving the multi-slot TB, information identifying the CBs as CBs of the multi-slot TB; and identifying the CBs as CBs of the multi-slot TB based at least in part on the information received in association with the multi-slot TB.

10. The method of claim 9, wherein the information received in association with the multi-slot TB comprises CBG transmission information (CBGTI) indicating the plurality of CBGs are CBGs of the multi-slot TB.

11. The method of claim 9, wherein the information received in association with the multi-slot TB comprises a same hybrid automatic repeat request (HARQ) process identifier (PID) for all CBGs of the multi-slot TB.

12. The method of claim 9, wherein the information received in association with the multi-slot TB comprises a new data indicator (NDI) for a first frame slot of the plurality of frame slots indicating the CBGs of a respective set of one or more CBGs mapped to the first frame slot as new data and a NDI for all subsequent frame slots of the plurality of frame slots indicating the CBGs of respective sets of one or more CBGs mapped to the subsequent frame slots as other than new data.

13. The method of claim 9, further comprising:
determining a maximum number of CBGs for the multi-slot TB, wherein the maximum number of CBGs is a maximum number of CBGs across all TB segments of the multi-slot TB.

14. The method of claim 9, further comprising:
determining a number of the CBGs the CBs for a first TB segment are mapped to base at least in part on CBG transmission information (CBGTI) associated with a frame slot of the first TB segment.

15. The method of claim 9, further comprising:
receiving, from the transmitting wireless device in association with the multi-slot TB, information indicating whether all CBGs of the CBGs for the multi-slot TB have been completed.

16. The method of claim 9, wherein at least one of a modulation coding scheme (MCS) is changed between TB segments of the multi-slot TB, a redundancy version (RV) is changed between CBGs of a TB segment of the multi-slot TB, or the CBGs mapped to different TB segments of the multi-slot TB include different sized CBGs.

17. An apparatus for wireless communication comprising:
a processor;
a memory coupled with the processor; and
instructions stored in the memory and executable by the processor to cause the apparatus to:
map a plurality of codeblocks (CBs) for a multi-slot transport block (TB) to a plurality of codeblock groups (CBGs), wherein the multi-slot TB comprises a plurality of frame slots of a transmission frame;
map a plurality of sets of one or more CBGs of the plurality of CBGs to the plurality of frame slots of the multi-slot TB, each set of CBGs being mapped to a respective frame slot of the plurality of frame slots such that all the CBs in each respective CBG are mapped to the respective frame slot and such that all the CBs in each respective CBG are entirely contained within the respective frame slot; and
transmit, to a receiving wireless device, the multi-slot TB including the plurality of CBs over the plurality of frame slots, each set of CBGs corresponding to a respective TB segment of a plurality of TB segments of the multi-slot TB.

18. The apparatus of claim 17, wherein the instructions further cause the apparatus to:
transmit, to the receiving wireless device in association with transmitting the multi-slot TB, CBG transmission information (CBGTI) indicating that the plurality of CBGs are CBGs of the multi-slot TB for identifying the plurality of CBs as CBs of the multi-slot TB.

19. The apparatus of claim 17, wherein the instructions further cause the apparatus to:
transmit, to the receiving wireless device in association with transmitting the multi-slot TB, a same hybrid automatic repeat request (HARD) process identifier (PID) for all CBGs of the multi-slot TB for identifying the plurality of CBs as CBs of the multi-slot TB.

20. The apparatus of claim 17, wherein the instructions further cause the apparatus to:
transmit, to the receiving wireless device in association with transmitting the multi-slot TB, a new data indicator (NDI) for a first frame slot of the plurality of frame slots indicating the CBGs of a respective set of one or more CBGs mapped to the first frame slot as new data and a NDI for all subsequent frame slots of the plurality of frame slots indicating the CBGs of respective sets of one or more CBGs mapped to the subsequent frame slots as other than new data for identifying the plurality of CBs as CBs of the multi-slot TB.

21. The apparatus of claim 17, wherein the instructions further cause the apparatus to:
determine a size of the multi-slot TB such that the multi-slot TB accommodates a number of bits in excess of that which can be transmitted within a single frame slot;
determine a number of CBs of the plurality of CBs for the multi-slot TB based at least in part upon the size of the multi-slot TB, wherein the number of CBs is a number of CBs across all TB segments of the multi-slot TB; and
determine a maximum number of CBGs for the multi-slot TB, wherein the maximum number of CBGs is a maximum number of CBGs across all TB segments of the multi-slot TB.

22. The apparatus of claim 17, wherein the instructions further cause the apparatus to:
transmit, to the receiving wireless device in association with transmitting the multi-slot TB, information indicating whether all CBGs of the plurality of CBGs for the multi-slot TB have been completed.

23. The apparatus of claim 17, wherein the at least one of a modulation coding scheme (MCS) is changed between TB segments of the multi-slot TB, a redundancy version (RV) is changed between CBGs of a TB segment of the multi-slot TB, or the CBGs mapped to different TB segments of the multi-slot TB include different sized CBGs.

24. An apparatus for wireless communication comprising:
a processor;

a memory coupled with the processor; and
instructions stored in the memory and executable by the processor to cause the apparatus to:
  receive, from a transmitting wireless device, a multi-slot transport block (TB) including a plurality of codeblocks (CBs) mapped to a plurality of codeblock groups (CBGs), wherein the multi-slot TB comprises a plurality of frame slots of a transmission frame, and wherein a plurality of sets of one or more CBGs of the plurality of CBGs are mapped to the plurality of frame slots of the multi-slot TB, each set of CBGs being mapped to a respective frame slot of the plurality of frame slots such that all the CBs in each respective CBG are mapped to the respective frame slot and such that all the CBs in each respective CBG are entirely contained within the respective frame slot;
  receive, from the transmitting wireless device in association with receiving the multi-slot TB, information identifying the CBs as CBs of the multi-slot TB; and
  identify the CBs as CBs of the multi-slot TB based at least in part on the information received in association with the multi-slot TB.

25. The apparatus of claim 24, wherein the information received in association with the multi-slot TB comprises CBG transmission information (CBGTI) indicating the plurality of CBGs are CBGs of the multi-slot TB.

26. The apparatus of claim 24, wherein the information received in association with the multi-slot TB comprises a same hybrid automatic repeat request (HARQ) process identifier (PID) for all CBGs of the multi-slot TB.

27. The apparatus of claim 24, wherein the information received in association with the multi-slot TB comprises a new data indicator (NDI) for a first frame slot of the plurality of frame slots indicating the CBGs of a respective set of one or more CBGs mapped to the first frame slot as new data and a NDI for all subsequent frame slots of the plurality of frame slots indicating the CBGs of respective sets of one or more CBGs mapped to the subsequent frame slots as other than new data.

28. The apparatus of claim 24, wherein the instructions further cause the apparatus to:
  determine a maximum number of CBGs for the multi-slot TB, wherein the maximum number of CBGs is a maximum number of CBGs across all TB segments of the multi-slot TB; and
  determine a number of the CBGs the CBs for a first TB segment are mapped to base at least in part on CBG transmission information (CBGTI) associated with a frame slot of the first TB segment.

29. The apparatus of claim 24, wherein the instructions further cause the apparatus to:
  receiving, from the transmitting wireless device in association with the multi-slot TB, information indicating whether all CBGs of the CBGs for the multi-slot TB have been completed.

30. The apparatus of claim 24, wherein the at least one of a modulation coding scheme (MCS) is changed between TB segments of the multi-slot TB, a redundancy version (RV) is changed between CBGs of a TB segment of the multi-slot TB, or the CBGs mapped to different TB segments of the multi-slot TB include different sized CBGs.

* * * * *